(12) United States Patent
Li et al.

(10) Patent No.: US 9,360,702 B2
(45) Date of Patent: Jun. 7, 2016

(54) ARRAY SUBSTRATE AND TRANSFLECTIVE LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jing Li, Beijing (CN); Zhenyu Xie, Beijing (CN); Xu Chen, Beijing (CN); Da Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 27 days.

(21) Appl. No.: 14/355,273

(22) PCT Filed: Dec. 3, 2013

(86) PCT No.: PCT/CN2013/088410
§ 371 (c)(1),
(2) Date: Apr. 30, 2014

(87) PCT Pub. No.: WO2014/198108
PCT Pub. Date: Dec. 18, 2014

(65) Prior Publication Data
US 2016/0033819 A1    Feb. 4, 2016

(30) Foreign Application Priority Data

Jun. 13, 2013    (CN) .......................... 2013 1 0233614

(51) Int. Cl.
*G02F 1/1335*    (2006.01)
*G02F 1/1368*    (2006.01)
(Continued)

(52) U.S. Cl.
CPC ........ *G02F 1/133555* (2013.01); *G02F 1/1334* (2013.01); *G02F 1/1368* (2013.01); *G02F 1/13439* (2013.01); *G02F 1/136286* (2013.01)

(58) Field of Classification Search
CPC ............ G02F 1/133555; G02F 1/1334; G02F 1/13439; G02F 1/136286; G02F 1/1368
See application file for complete search history.

(56) References Cited

U.S. PATENT DOCUMENTS

| 2007/0159678 | A1 | 7/2007 | Verhaegh et al. |
| 2008/0111958 | A1* | 5/2008 | Kleverman ....... G02F 1/133555 349/114 |

(Continued)

FOREIGN PATENT DOCUMENTS

| CN | 1856733 A | 11/2006 |
| CN | 101556414 A | 10/2009 |

(Continued)

OTHER PUBLICATIONS

Second Chinese Office Action dated Dec. 22, 2014; Appln. No. 201310233614.X.

(Continued)

*Primary Examiner* — James Dudek
(74) *Attorney, Agent, or Firm* — Ladas & Parry LLP

(57) ABSTRACT

An array substrate and a transflective liquid crystal display panel. The array substrate includes: a plurality of sub-pixel areas defined by gate lines and data lines distributed across each other, each of the sub-pixel areas comprising a transmission area and a reflection area, wherein, the array substrate further comprises an adjustment module; the adjustment module is configured to transmit an adjustment signal to the reflection area and adjust the reflection area from opaque state to transparent state upon an external light intensity being smaller than a preset light intensity.

16 Claims, 2 Drawing Sheets

(51) Int. Cl.
  *G02F 1/1362*  (2006.01)
  *G02F 1/1334*  (2006.01)
  *G02F 1/1343*  (2006.01)

(56) References Cited

U.S. PATENT DOCUMENTS

2010/0060825 A1  3/2010  Jang et al.
2014/0132898 A1  5/2014  Qin et al.

FOREIGN PATENT DOCUMENTS

| CN | 101600986 A | 12/2009 |
| CN | 101673525 A | 3/2010 |
| CN | 102087446 A | 6/2011 |
| CN | 102929034 A | 2/2013 |
| CN | 1013309103 A | 9/2013 |

OTHER PUBLICATIONS

Third Chinese Office Action Appln. No. 201310233614.X; Dated May 18, 2015.
International Search Report mailed Mar. 20, 2014; PCT/CN2013/088410.
First Chiene Office Action dated May 5, 2014; Appln. No. 201310233614.X.
International Preliminary Report on Patentability Appln. No. PCT/CN2013/088410; Dated Dec. 15, 2015.
Fifth Chinese Office Action dated Apr. 12, 2016; Appln. No. 201310233614.X.

* cited by examiner

ARRAY SUBSTRATE AND TRANSFLECTIVE LIQUID CRYSTAL DISPLAY PANEL

TECHNICAL FIELD

Embodiments of the present invention relate to an array substrate and a transflective liquid crystal display panel.

BACKGROUND

Transflective liquid crystal display panels have advantages such as low power consumption and strong adaptability to ambient light, are a common panel display technology at present and broadly applied in mobile display devices such as cell-phones and personal digital assistants (PDA). A transflective liquid crystal display panel may display images in a transmission mode and a reflection mode alone or in combination, therefore may be applied in any ambient light. In a basic structure for a transflective liquid crystal display panel, each of the red, green and blue sub-pixel units is divided into a transmission area and a reflection area such that liquid crystal in the transmission area works in a transmission mode and liquid crystal in the reflection area works in a reflection mode. Its operating principle is as follows: when the circumstance is dark, light transmits the transmission area and the device works in the transmission mode, while in a bright circumstance, external light intensity is larger than that of the backlight source, the transflective liquid crystal display panel works in the reflection mode to display images by reflecting light from outside.

The inventor found in the process of making the present invention that, the reflection areas typically reflect external light by disposing an opaque metal layer, in case of dark circumstance, the metal layer in reflection areas would influence the opening ratio of the transflective liquid crystal display panel and hence reduce its brightness.

SUMMARY

One of the technical problems to be addressed by the present invention is to provide an array substrate and a transflective liquid crystal display panel that can increase opening ratio of the transflective liquid crystal display panel using the array substrate.

According to one embodiment of the present invention, an array substrate is provided including a plurality of sub-pixel areas defined by gate lines and data lines distributed across each other, each of the sub-pixel areas comprising a transmission area and a reflection area, wherein, the array substrate further comprises an adjustment module;

the adjustment module is configured to transmit an adjustment signal to the reflection area and adjust the reflection area from opaque state to transparent state upon an external light intensity being smaller than a preset light intensity.

In one example, the reflection area comprises a polymer dispersed liquid crystal layer.

In one example, the reflection area further comprises a transparent enhanced reflection layer on the polymer dispersed liquid crystal layer and the enhanced reflection layer has a relative refraction index greater than that of the polymer dispersed liquid crystal layer.

In one example, the enhanced reflection layer has a plurality of protrusions on its surface.

In one example, the protrusion has a section of trapezoid.

In one example, the array substrate further includes:

a first signal line, a second signal line and a switching transistor, the first signal line connecting the adjustment module and a gate electrode of the switching transistor, the second signal line connecting the adjustment module and a source electrode of the switching transistor, and a drain electrode of the switching transistor being connected with the polymer dispersed liquid crystal layer.

In one example, the gate electrode, the gate insulating layer and the drain electrode of the switching transistor are transparent.

In one example, a transparent insulating layer is covered on a surface of the switching transistor and the polymer dispersed liquid crystal layer.

In one example, the adjustment module comprises a photoelectric sensing device configured to sense external light intensity to determine whether to transmit the adjustment signal.

In one example, the adjustment module is configured to be able to transmit the first adjustment signal through the first signal line to control turning on/off of the switching transistor and transmit the second adjustment signal through the second signal line to control transparent/non-transparent state of the polymer dispersed liquid crystal layer.

In one example, the reflection area and the transmission area both comprise transparent pixel electrodes.

In one example, the reflection area and the transmission area further comprise transparent common electrodes.

In one example, each sub-pixel area further comprises a sub-pixel thin film transistor connected with the pixel electrode.

According to another embodiment of the present invention, there is provided a transflective liquid crystal display panel including the above-mentioned array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
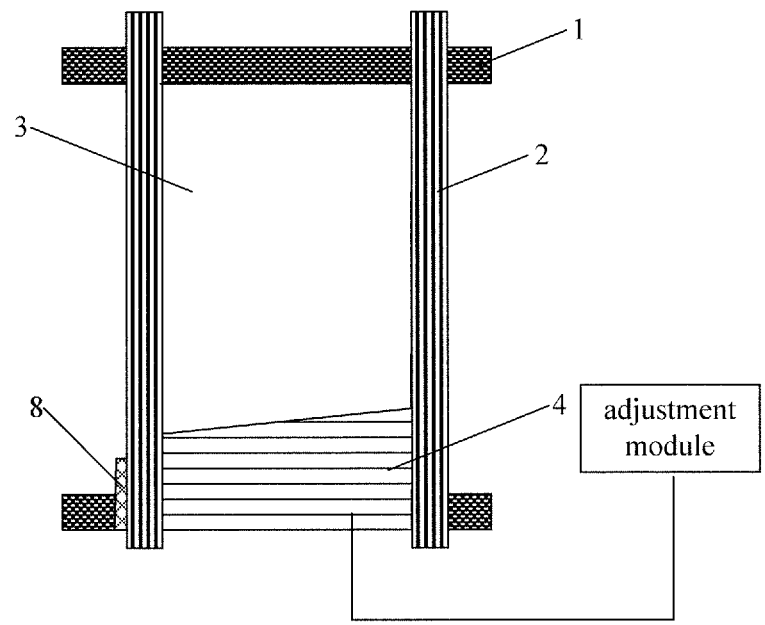
FIG. 1 is a structure diagram I of an array substrate in an embodiment of the present invention.

An embodiment of the present invention provides an array substrate as illustrated in FIG. 1, including a plurality of sub-pixel areas defined by gate lines 1 and data lines 2 distributed across each other. Each of the sub-pixel areas includes a transmission area 3 and a reflection area 4. The array substrate further includes an adjustment module.

Upon the external light intensity being smaller than a preset light intensity, the adjustment module transmits an adjustment signal and adjusts the reflection area 4 from opaque state to transparent state.

Upon the external light intensity being greater than or equal to the preset light intensity, which means the transflective liquid crystal display panel is now in a bright circumstance, the reflection area 4 is in opaque state, the opaque reflection area 4 reflects light from outside and utilizes the reflected external light for display. Upon the external light intensity being smaller than the preset light intensity, which means the external circumstance is now dark, the adjustment module transmits an adjustment signal and adjusts the reflection area 4 into transparent state, allowing light from the backlight source to transmit the transparent reflection area 4, therefore the entire sub-pixel area can display, hence increasing opening ratio of the transflective liquid crystal display panel.

The reflection areas 4 in the array substrate provided in embodiments of the present invention includes a polymer dispersed liquid crystal layer 41. By the polymer dispersed liquid crystal, it means mixing low molecular liquid crystal with prepolymer and forming micron-sized liquid crystal droplets by polymerization reaction under certain conditions, and dispensing the droplets uniformly in a high molecular mesh, then obtaining a material with electro-light response characteristic by means of dielectric anisotropy of the liquid crystal molecules, which mainly works between a scattering state and a transparent state and has a certain gray scale.

Without an applied electrical signal, no regular electric field can be formed between the polymer dispersed liquid crystal layers 41 and optical axes of liquid crystal particles are oriented randomly in a disordered state. The polymer dispersed liquid crystal layers 41 appear opaque or translucent.

Upon an electrical signal being applied, optical axes of liquid crystal particles are aligned perpendicular to surfaces of the polymer dispersed liquid crystal layers, incident light is not scattered, and the thin film appears transparent.

Therefore, the polymer dispersed liquid crystal layer 41 can switch between opaque state and transparent state while being driven by the electrical signal. Thus the reflection areas 4 in embodiments of the present invention may adopt the polymer dispersed liquid crystal layer 41.

Figure 2:
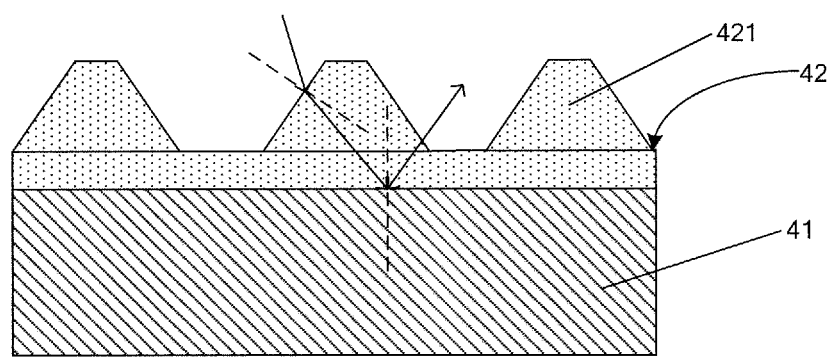
FIG. 2 is a structure diagram of a reflection area in an embodiment of the present invention.

It follows that in case the polymer dispersed liquid crystal layer 41 does not receive an adjustment signal, it may exhibit an opaque state, and may also exhibit a translucent state, therefore, relying only on the polymer dispersed liquid crystal layer, the reflection efficiency of reflection areas 4 may be not ideal. In order to increase reflection efficiency of reflection areas 4, preferably, as illustrated in FIG. 2, the reflection area 4 further includes an transparent enhanced reflection layer 42 located on the polymer dispersed liquid crystal layer 41, which has a plurality of protrusions 421 on its surface and has a relative refraction index greater than that of the polymer dispersed liquid crystal layer 41.

The polymer dispersed liquid crystal layer 41 has a relative refraction index of about 1.4 to 1.6 upon no adjustment signal being received. In order to enable total reflection of light in the enhanced reflection layer 42 on the surface of the polymer dispersed liquid crystal layer 41, the relative refraction index of the enhanced reflection layer 42 should be greater than 1.6. In embodiments of the present invention, the enhanced reflection layer 42 is preferably made of transparent materials such as silicon nitride. It is possible to adjust the relative refraction index of enhanced reflection layer 42 by adjusting ratio of nitrogen to silicon in the enhanced reflection layer 42. In general, the relative refraction index of the enhanced reflection layer 22 is controlled at about 2.0, which is enough to satisfy requirements of embodiments of the present invention.

It follows that the polymer dispersed liquid crystal layer (or combination of the polymer dispersed liquid crystal layer and the enhanced reflection layer) according to embodiments of the present invention may be regarded as an adjustable reflection structure of the reflection areas. While the adjustable reflection structure may be controlled by the adjustment module as in a reflection state (corresponding to the polymer dispersed liquid crystal layer in opaque state or translucent state) or a transparent state. Therefore, pixel electrodes of reflection areas on the array substrate according to embodiments of the present invention are also transparent and can allow the reflection areas to transmit light when the above-mentioned adjustable reflection structure is in a transmission state.

In embodiments of the present invention, the adjustment signal generally has a value of 5 V to 20 V. And the adjustment signal sometimes can have a voltage value of over 20 V or below 5 V depending on variation of high molecular material in the polymer dispersed liquid crystal layer and different mass ratio of high molecule to liquid crystal.

In order to increase the ratio of light in the enhanced reflection layer 42 that is totally reflected on the surface of the polymer dispersed liquid crystal layer 41, the surface of the enhanced reflection layer 42 may not be flat but a structure having a plurality of protrusions 421. The section of a protrusion 421 may be regular polygon, hemicycle, irregular shapes etc., preferably trapezoid.

Figure 3:
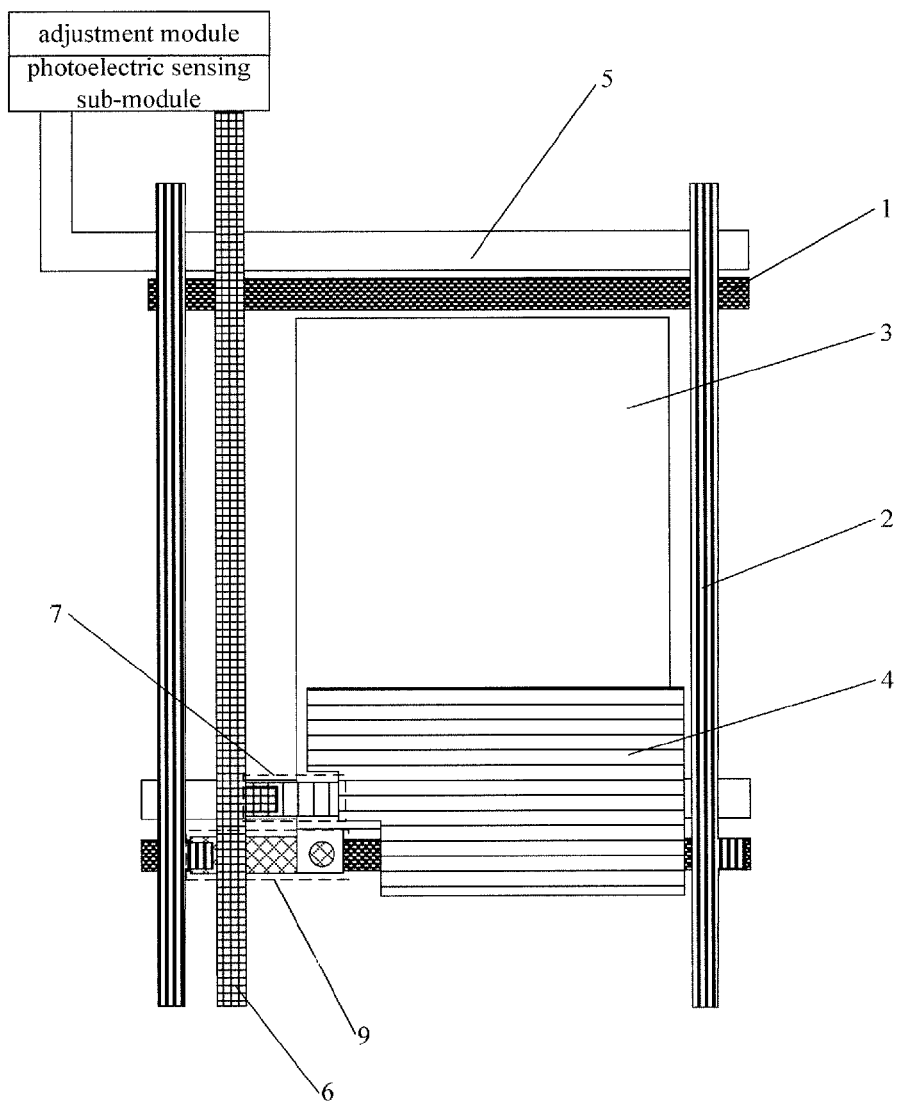
FIG. 3 is a structure diagram II of an array substrate in an embodiment of the present invention.

Further, in order to transfer signals between the adjustment module and the polymer dispersed liquid crystal layer 41 in the reflection areas, as illustrated in FIG. 3, the array substrate further includes:

A first signal line 5, a second signal line 6 and a switching transistor 7, the first signal line 5 connecting the adjustment module and a gate electrode of the switching transistor 7, the second signal line 6 connecting the adjustment module and a source electrode of the switching transistor 7, and a drain electrode of the switching transistor 7 being connected with the polymer dispersed liquid crystal layer 41.

It follows that in embodiments of the present invention, the adjustment signal from the adjustment module flows into the gate electrode of the switching transistor 7 via the first signal line 5 to turn on the switching transistor 7; at the same time, the adjustment signal in the second signal line 6 passes through the source electrode 74 and the drain electrode 75 of the switching transistor 7 and finally acts on the polymer dispersed liquid crystal layer 41 to adjust the polymer dispersed liquid crystal layer 41 from opaque or translucent state into transparent state.

For example, the adjustment module is configured to be able to transmit the first adjustment signal through the first signal line to control turning on/off of the switching transistor and transmit the second adjustment signal through the second signal line to control transparent/non-transparent state of the polymer dispersed liquid crystal layer.

Figure 4:
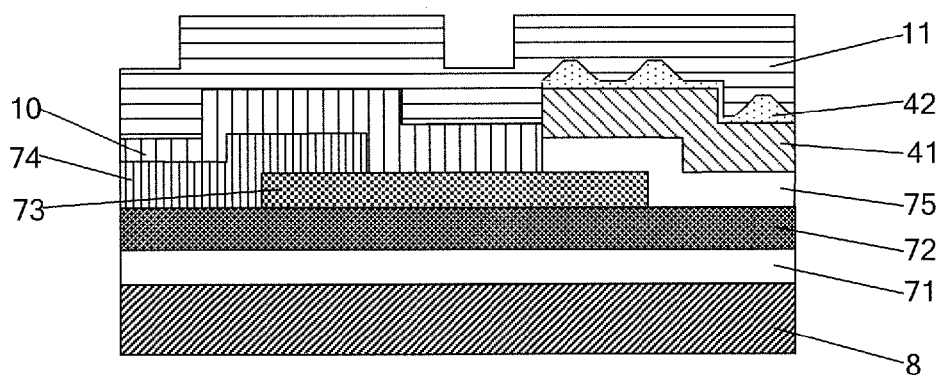
FIG. 4 is a structure diagram of a switching transistor in an embodiment of the present invention.

In order to ensure opening ratio of sub-pixel areas, preferably, as illustrated in FIG. 4, the gate electrode 71, the gate insulating layer 72 and the drain electrode 75 of the switching transistor 7 are transparent. For example, the gate electrode 71 and the drain electrode 75 are preferably made of transparent conducting material such as transparent indium tin oxide and indium zinc oxide; material for the gate insulating layer 72 is preferably silicon oxide or insulating material such as silicon nitride and hafnium oxide or multi-layer combination of multiple insulating materials.

The switching transistors 7 may be fabricated at the same time as sub-pixel thin film transistors on the array substrate with the fabrication process roughly as follows:

Gate electrodes of sub-pixel thin film transistors 9 and gate electrodes 71 of switching transistors 7 are formed on the substrate 8. The gate electrodes of the sub-pixel thin film transistors 9 are preferably made of aluminum, or metals such as molybdenum, tungsten, titanium, copper or alloy of the above, or multi-layer structure combination of the above metals, with a thickness of 100 nm to 500 nm. The gate electrodes 71 of the switching transistors are preferably made of transparent conducting materials such as transparent indium tin oxide and indium zinc oxide with a thickness of 50 nm to 500 nm. Preferably, the gate electrodes of sub-pixel thin film transistors 9 and the gate electrodes 71 of switching transistors 7 are consistent in thickness.

Thereafter, it is possible to successively form the gate insulating layer 72 and the active layer 73 of the sub-pixel thin film transistors and switching transistors 7. It is possible to use plasma enhanced chemical vapor deposition method (PECVD) to deposit the gate insulating layer 72 and the active layer 73 and complete fabrication of them by one mask etching process. Generally, the gate insulating layer 72 is preferably made of transparent insulating material such as silicon oxide, silicon nitride and hafnium oxide, or made of a multi-layer structure formed of various transparent insulating materials, with a thickness of 250 nm to 600 nm. The active layer is preferably made of amorphous silicon, or semiconductor materials such as polysilicon, indium gallium zinc oxide, with a thickness of 100 nm to 300 nm.

Next, the source electrodes 74 and drain electrodes 75 of the sub-pixel thin film transistors 9 and switching transistors 7 are formed. Source electrodes and drain electrodes of sub-pixel thin film transistors 9 and source electrodes 74 of switching transistors 7 are formed by a same layer of metal deposition and may be made of metals such as aluminum, molybdenum, tungsten, titanium and copper or alloy or multi-layered structure of the above metals. Drain electrodes of the switching transistors 7 are preferably made of various transparent conducting materials such as transparent indium tin oxide and indium zinc oxide with a thickness of 50 nm to 500 nm.

The fabrication process for switching transistors 7 is completed so far. In order to save manufacturing costs, realize a more compact structure of reflection areas 4 and connect drain electrodes 75 of switching transistors 7 with the polymer dispersed liquid crystal layer 41, it is possible to deposit parts of the polymer dispersed liquid crystal layer 41 and the enhanced reflection layer 42 on the drain electrodes directly, as illustrated in FIG. 4. The polymer dispersed liquid crystal layer 41 has a thickness of 300-1000 nm. The enhanced reflection layer 42 is made of transparent insulating material such as silicon oxide, silicon nitride and hafnium oxide, or a multi-layered structure formed of various transparent insulating materials, with a thickness of 50 nm to 300 nm. Its surface has a plurality of protrusions 421 to increase probability of total reflection of light on the surface of the polymer dispersed liquid crystal layer 41.

Thereafter, a channel protecting layer 10 may be deposited on the source electrodes 74 of switching transistors 7 and the active layer 73 exposed between the source electrodes 74 and the drain electrodes 75. Finally, an insulating layer 11 is deposited on the surface of the enhanced reflection layer 42 on the switching transistors 7 and the polymer dispersed liquid crystal layer 41 and on the surface of sub-pixel thin film transistors. The insulating layer 11 is made of transparent insulating material such as silicon oxide, silicon nitride and resin, or a multi-layered structure formed of various transparent insulating materials, with a thickness of 800 nm to 2000 nm. The deposition of insulating layer 11 prevents height difference between switching transistors 7 and other parts, which is in favor of subsequent fabrication and treatment of the array substrate.

For example, the insulating layer 11 is at least disposed in the reflection areas 4 and the transmission areas 3 to cancel height difference caused by switching transistors 7 in the pixel areas. For example, each sub-pixel area further includes a pixel electrode disposed on the insulating layer 11 in the reflection area 4 and the transmission area 3. For example, each sub-pixel area may further include a common electrode disposed over the pixel electrode via a passivation layer. The pixel electrode and the common electrode are both made of transparent conducting material. For example, the pixel electrode may be connected with the drain electrode of the sub-pixel thin film transistor. However, the array substrate according to embodiments of the present invention is not limited to the above-mentioned structure. For example, in case that the gate electrodes 71, gate insulating layer 72 and drain electrodes 75 of switching transistors 7 are all transparent, the pixel electrodes according to the present invention may also be disposed below the polymer dispersed liquid crystal layer and the switching transistor 7.

For example, as illustrated in FIG. 3, it can be seen in the plan view that the reflection areas 4 are disposed at lower positions of the sub-pixel areas. However, embodiments according to the present invention are not limited thereto, reflection areas may be disposed at the middle, the upper or any other suitable positions in the sub-pixel area.

As can be known from the above description, as illustrated in FIG. 3, the first signal line 5 is connected with the gate electrode 71 of the switching transistor 7 and functions similarly to the gate line in prior art, therefore it is possible to arrange it parallel to the gate lines on the array substrate and make it with transparent material to prevent the first signal line 5 from influencing opening ratio of the sub-pixel areas. For example, parts of the first signal line 5 for transferring the adjustment signal may be made of transparent conducting material such as transparent indium tin oxide and indium zinc oxide, and insulating parts in the first signal line 5 may be made of insulating material such as transparent silicon oxide, silicon nitride and hafnium oxide or multi-layer combination of the above various insulating materials.

Similarly, as illustrated in FIG. 3, the second signal line 6 is connected with the source electrode of the switching transistor 7 and functions similarly to data lines in prior art, therefore they can be arranged parallel to data lines on the array substrate.

In practice, when the switching transistor 7 has a sufficiently large capacitance, the role of the second signal line 6 may be taken on by the data line 2 to adjust the polymer dispersed liquid crystal layer 41 between frame switching or in case of black screen. Then rotation of liquid crystal of the polymer dispersed liquid crystal layer 41 is maintained by quantity of electric charges stored in the capacitor of the switching transistor 7 to allow reflection areas 4 of the sub-pixel areas to normally display under dark circumstance.

In the technical solution of an embodiment of the present invention, the adjustment module transmitting adjustment signal may be implemented by user's manual operation. Now the adjustment module is preferably a common level output circuit and the transflective liquid crystal display panel is provided with a switch key connected with the adjustment module. When the user feels that the external light intensity is weak, the switch key may be pressed by oneself to turn on the adjustment module that can transmit an adjustment signal with a certain level.

In addition to manual control for the adjustment module to transmit adjustment signal, the adjustment signal may also be transmitted by the adjustment module automatically. When the adjustment module has the function of automatically transmitting adjustment signal, preferably, as illustrated in FIG. 3, the adjustment module includes a photoelectric sensing device. When the photoelectric sensing device senses that light intensity from outside is greater than a preset light intensity, the adjustment module is activated to transmit adjustment signal automatically. For example, the photoelectric sensing device is configured to sense external light intensity to decide whether to transmit the adjustment signal.

The array substrate in embodiments of the present invention is applicable to driving modes such as the advanced super dimension switch (ADS) and twisted nematic (TN) mode and the like.

In the technical solution of the present embodiment, an array substrate is provided in which when external light intensity is smaller than a preset light intensity, the adjustment module transmits an adjustment signal and adjust the reflection areas from non-transparent state to transparent state. Then the entire sub-pixel area may be used for display, which increases opening ratio of the transflective liquid crystal display panel utilizing the array substrate.

The above description focused on the adjustable reflection structure of reflection areas of the array substrate. However, the array substrate according to embodiments of the present invention may further include any other appropriate components required by a transflective array substrate. For example, the reflection areas and the transmission areas may include pixel electrodes, and may further include common electrodes. It is to be noted that since in embodiments of the present invention there is already an adjustable reflection structure and the reflection areas may transmit light when the adjustable reflection structure is in transparent state, the pixel electrodes and common electrodes herein both need to be transparent. For example, in each sub-pixel area, a sub-pixel thin film transistor may be further included to be connected with the pixel electrode to function as a switch of the sub-pixel.

Further, an embodiment of the present invention further provides a transflective liquid crystal display panel including the above-mentioned array substrate. The transflective liquid crystal display panel may be any product or component with display function, such as a liquid crystal panel, a cell-phone, a flat computer, a TV set, a display, a notebook computer, a digital picture frame or a navigator.

What are described above is related to the illustrative embodiments of the disclosure only and not limitative to the scope of the disclosure; the scopes of the disclosure are defined by the accompanying claims.

The invention claimed is:

1. An array substrate comprising a plurality of sub-pixel areas defined by gate lines and data lines distributed across each other, each of the sub-pixel areas comprising a transmission area and a reflection area, wherein,
the array substrate further comprises an adjustment module;
the adjustment module is configured to transmit an adjustment signal to the reflection area and adjust the reflection area from opaque state to transparent state upon an external light intensity being smaller than a preset light intensity,
wherein the reflection area comprises a polymer dispersed liquid crystal layer, and
wherein the reflection area further comprises a transparent enhanced reflection layer on the polymer dispersed liquid crystal layer and the enhanced reflection layer has a relative refraction index greater than that of the polymer dispersed liquid crystal layer.

2. The array substrate of claim 1, wherein the enhanced reflection layer has a plurality of protrusions on its surface.

3. The array substrate of claim 2, wherein the protrusion has a section of trapezoid.

4. The array substrate of claim 1, further comprising:
a first signal line, a second signal line and a switching transistor, the first signal line connecting the adjustment module and a gate electrode of the switching transistor, the second signal line connecting the adjustment module and a source electrode of the switching transistor, and a drain electrode of the switching transistor being connected with the polymer dispersed liquid crystal layer.

5. The array substrate of claim 4, wherein
the gate electrode, the gate insulating layer and the drain electrode of the switching transistor are transparent.

6. The array substrate of claim 5, wherein
a transparent insulating layer is covered on a surface of the switching transistor and the polymer dispersed liquid crystal layer.

7. The array substrate of claim 1, wherein
the adjustment module comprises a photoelectric sensing device configured to sense external light intensity to determine whether to transmit the adjustment signal.

8. The array substrate of claim 4, wherein
the adjustment module is configured to be able to transmit a first adjustment signal through the first signal line to control turning on/off of the switching transistor and transmit a second adjustment signal through the second signal line to control transparent/non-transparent state of the polymer dispersed liquid crystal layer.

9. The array substrate of claim 1, wherein the reflection area and the transmission area both comprise transparent pixel electrodes.

10. The array substrate of claim 9, wherein the reflection area and the transmission area further comprise transparent common electrodes.

11. The array substrate of claim 9, wherein each sub-pixel area further comprises a sub-pixel thin film transistor connected with the pixel electrode.

12. A transflective liquid crystal display panel comprising the array substrate according to claim 1.

13. The array substrate of claim 2, further comprising:
a first signal line, a second signal line and a switching transistor, the first signal line connecting the adjustment module and a gate electrode of the switching transistor, the second signal line connecting the adjustment module and a source electrode of the switching transistor, and a drain electrode of the switching transistor being connected with the polymer dispersed liquid crystal layer.

14. The array substrate of claim 3, further comprising:
a first signal line, a second signal line and a switching transistor, the first signal line connecting the adjustment module and a gate electrode of the switching transistor, the second signal line connecting the adjustment module and a source electrode of the switching transistor, and a drain electrode of the switching transistor being connected with the polymer dispersed liquid crystal layer.

15. The array substrate of claim 2, wherein
the adjustment module comprises a photoelectric sensing device configured to sense external light intensity to determine whether to transmit the adjustment signal.
16. The array substrate of claim 3, wherein
the adjustment module comprises a photoelectric sensing device configured to sense external light intensity to determine whether to transmit the adjustment signal.

\* \* \* \* \*